(12) United States Patent
Catalano et al.

(10) Patent No.: US 10,713,423 B2
(45) Date of Patent: Jul. 14, 2020

(54) CONTENT ADJUSTMENT AND DISPLAY AUGMENTATION FOR COMMUNICATION

(71) Applicant: International Business Machines Corporation, Armonk, NY (US)

(72) Inventors: Pasquale A. Catalano, Wallkill, NY (US); Andrew G. Crimmins, Montrose, NY (US); Arkadiy Tsfasman, Wappingers Falls, NY (US); John Werner, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 307 days.

(21) Appl. No.: 15/793,356

(22) Filed: Oct. 25, 2017

(65) Prior Publication Data

US 2019/0121842 A1 Apr. 25, 2019

(51) Int. Cl.
| | | |
|---|---|---|
| *G06F 17/24* | (2006.01) | |
| *G06F 40/166* | (2020.01) | |
| *H04L 12/58* | (2006.01) | |
| *G06F 3/048* | (2013.01) | |
| *G06F 16/9038* | (2019.01) | |
| *G06F 40/30* | (2020.01) | |
| *G06F 40/247* | (2020.01) | |
| *G06F 40/253* | (2020.01) | |

(52) U.S. Cl.
CPC ............ *G06F 40/166* (2020.01); *G06F 3/048* (2013.01); *G06F 16/9038* (2019.01); *G06F 40/247* (2020.01); *G06F 40/253* (2020.01); *G06F 40/30* (2020.01); *H04L 51/02* (2013.01); *H04L 51/046* (2013.01); *H04L 51/12* (2013.01); *H04L 51/32* (2013.01); *H04L 51/16* (2013.01)

(58) Field of Classification Search
CPC combination set(s) only.
See application file for complete search history.

(56) References Cited

U.S. PATENT DOCUMENTS

| | | | |
|---|---|---|---|
| 9,460,163 B1 * | 10/2016 | Toal | ................... G06Q 30/0201 |
| 9,678,948 B2 | 6/2017 | Bhatt | |
| 9,686,217 B2 | 6/2017 | Prabhu | |
| 2017/0053949 A1 | 2/2017 | Shin et al. | |
| 2018/0253659 A1* | 9/2018 | Lee | ......................... H04L 51/02 |

\* cited by examiner

*Primary Examiner* — Shyue Jiunn Hwa
(74) *Attorney, Agent, or Firm* — Cantor Colburn LLP; Teddi Maranzano

(57) ABSTRACT

Embodiments of the invention include methods and systems for content adjustment. Aspects of the invention include receiving, by a processor, a message from a user. A desired sentiment level for the message is received and a sentiment of the message is analyzed. The sentiment of the message is comparted to the desired sentiment level for the message to determine one or more suggested edits for the message.

14 Claims, 8 Drawing Sheets

CONTENT ADJUSTMENT AND DISPLAY AUGMENTATION FOR COMMUNICATION

BACKGROUND

The present invention generally relates to electronic communications, and more specifically, to content adjustment and display augmentation for electronic communication.

In electronic communications between users, the content of this electronic communication can be misinterpreted by a receiver of the electronic communication. For example, a sender may have intended a certain tone or sentiment that might be lost on the receiver based on their interpretation of the communication. Certain biases are present in each user that can tend to cause misinterpretation of tone and sentiment that can be caused by the usage of certain words or phrases by the sender. The receiver of the communication might make assumptions about the communication that can differ from the sender's intent for the message.

SUMMARY

Embodiments of the present invention are directed to a computer-implemented method for content adjustment and display augmentation for electronic communication. A non-limiting example of the computer-implemented method includes receiving, by a processor, a message from a user. A desired sentiment level for the message is received and a sentiment of the message is analyzed. The sentiment of the message is comparted to the desired sentiment level for the message to determine one or more suggested edits for the message Embodiments of the present invention are directed to a system for content adjustment and display augmentation for electronic communication. A non-limiting example of the system includes receiving, by a processor, a message from a user. A desired sentiment level for the message is received and a sentiment of the message is analyzed. The sentiment of the message is comparted to the desired sentiment level for the message to determine one or more suggested edits for the message.

Embodiments of the invention are directed to a computer program product for content adjustment and display augmentation for electronic communication, the computer program product comprising a computer readable storage medium having program instructions embodied therewith. The program instructions are executable by a processor to cause the processor to perform a method. A non-limiting example of the method includes receiving, by a processor, a message from a user. A desired sentiment level for the message is received and a sentiment of the message is analyzed. The sentiment of the message is comparted to the desired sentiment level for the message to determine one or more suggested edits for the message.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
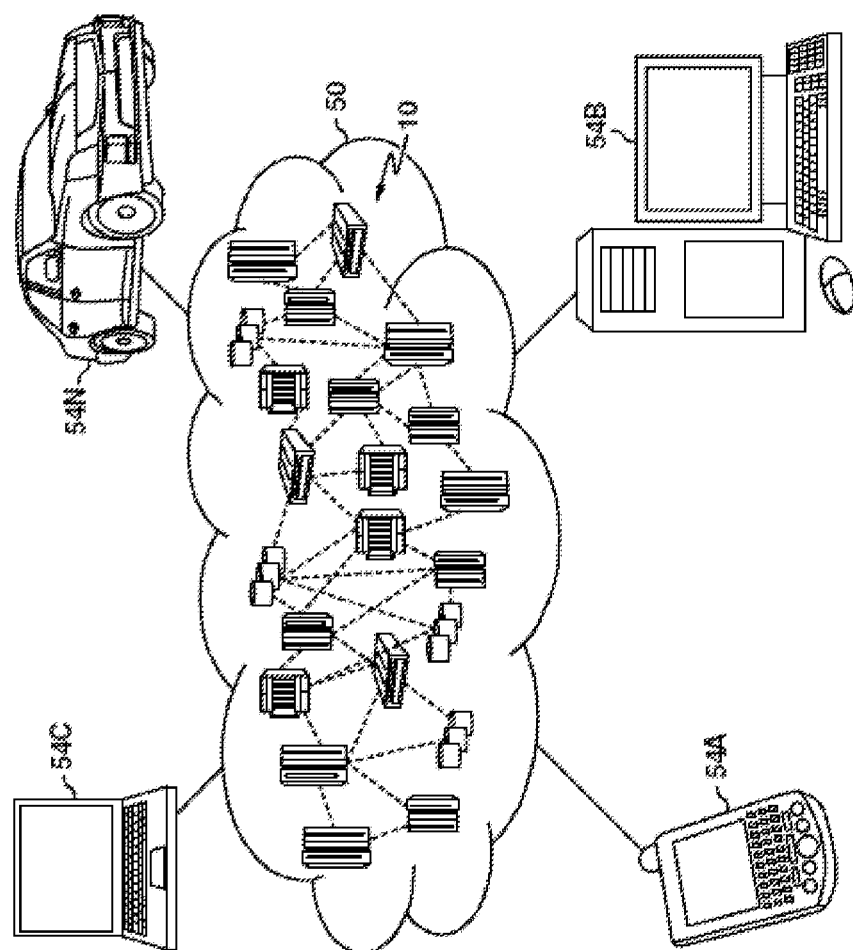
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
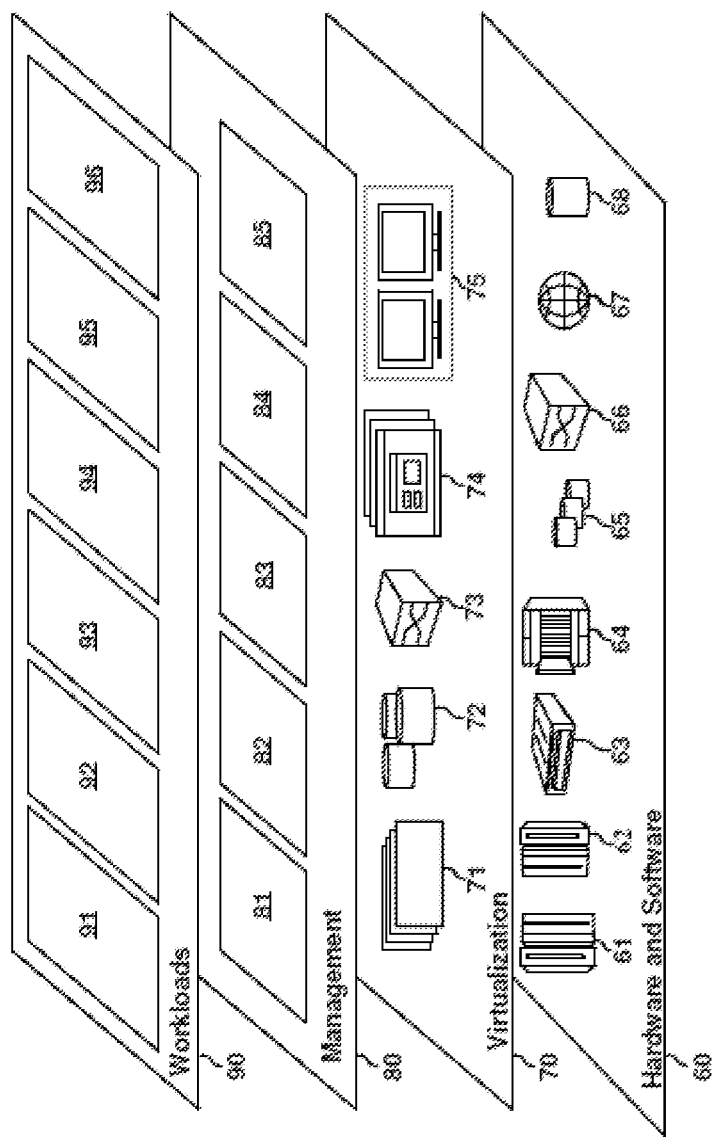
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content analysis and text augmentation 96.

Figure 3:
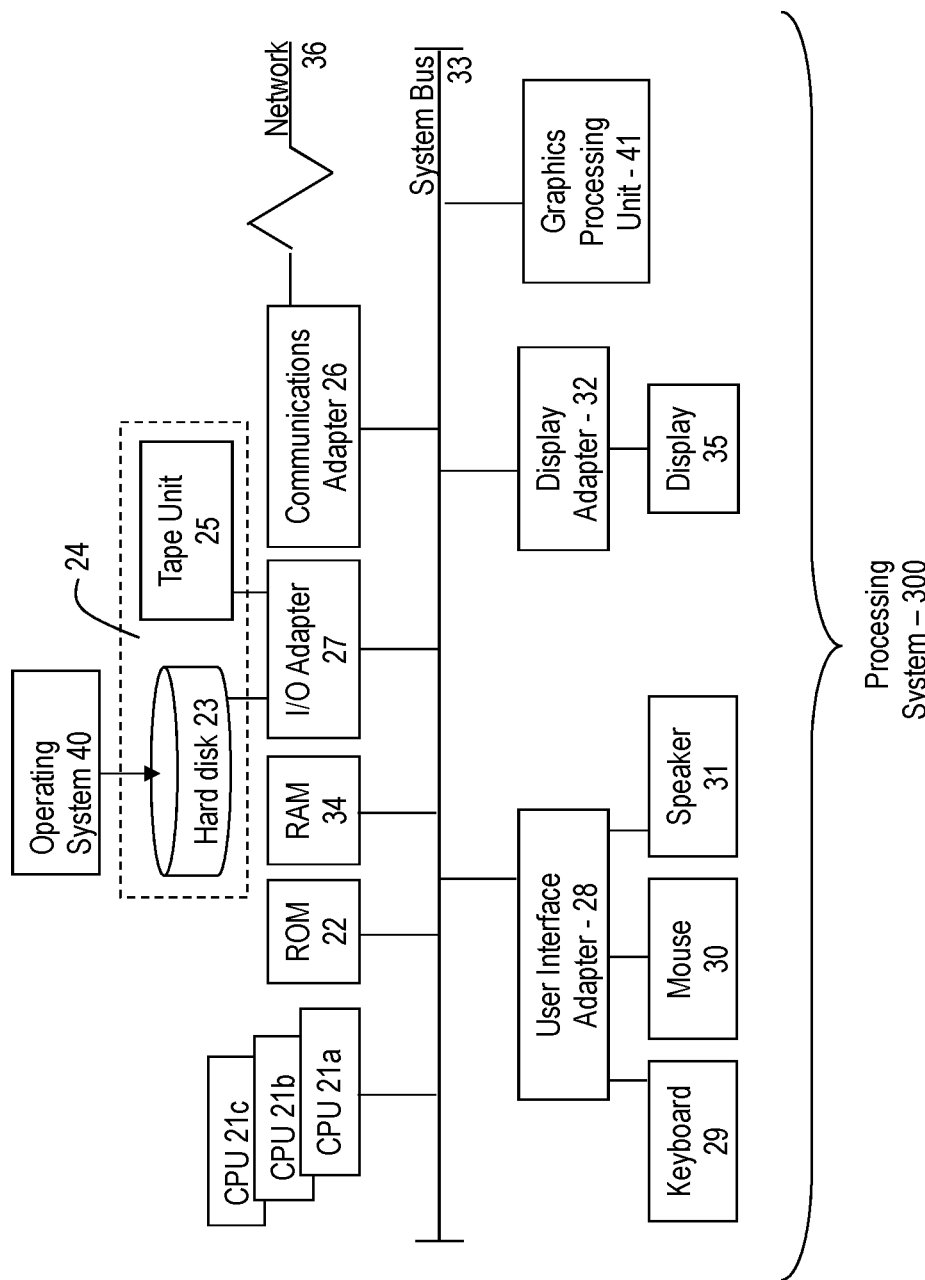
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, tonal and sentiment analysis can be utilized to determine and identify emotionally charged words or phrases in electronic communications. However, the mere identification of certain words or phrases does not assist a user in adjusting their communication to get to desired tone or sentiment. A need exists for electronic communications that allow a user to determine tone and sentiment and provide suggested changes and modifications to adjust the sentiment to account for a sender's original intent.

Turning now to an overview of the aspects of the invention, one or more embodiments of the invention address the above-described shortcomings of the prior art by providing content adjustment and display augmentation for electronic communications. In one or more embodiments of the present invention, a body of text can be analyzed via sentiment analysis that indicate to a sender the results of the analysis. A proposed modification to the text can be suggested or, alternatively, automatically inserted into the text that reflects the sender's intended tone. Proposed modifications can be taken from contextual information such as, for example, historical correspondence between the sender and the specific receiver.

Figure 4:
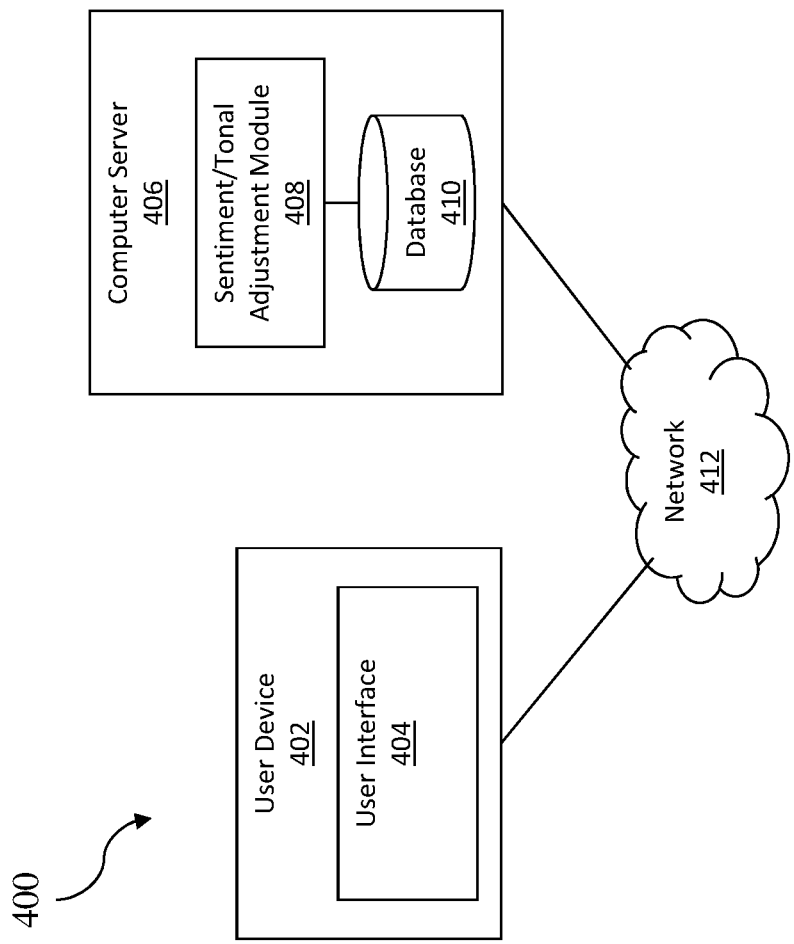
FIG. 4 depicts a system for content adjustment for electronic communication according to embodiments of the invention.

Turning now to a more detailed description of aspects of the present invention, FIG. 4 depicts a system 400 for content adjustment for electronic communication according to embodiments of the invention. The system 400 includes a user device 402 which includes a user interface 404. The system 400 also includes a computer server 406 which includes a sentiment/tonal adjustment module 408 and a database 410. Also, the system 400 includes a network 412.

In one or more embodiments of the invention, the user device 402 and computer server 406 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In one or more embodiments, the user device 402 allows a user to access the user interface 404. The user device 402 can be any of a laptop, mobile device, standalone computing device, or any other suitable electronic device capable of displaying, receiving, sending, and processing data via the user interface 404. The user interface 404 can communicate with the computer server 406 through the network 412. The network 412 can be any type of network such as, for example, a wired or wireless network. The computer server 406 can be a standalone computing device, messaging server, email server, a management server, a web server, a mobile computing device, or any other suitable electronic device or computing system capable of receiving, sending, and processing data. The database 410 is a repository of data utilized by the sentiment/tonal adjustment module 408. The database 410 can include data such as, for example, dictionary data, thesaurus data, and word sentiment index data that can be referenced by the sentiment/tonal adjustment module 408. The database 410 can also store a user messages history that includes any previous messaged sent by a user to a recipient. While the illustrative example shows the database 410 within the computer server 406, the database 410 can reside at any location and connect to the computer server 406 via a network connection. Also, while the illustrative examples shows a single database 410, any number of databases and/or memories can be utilized to store data as described above including a user message history that can be stored on the database 410 or stored on the user device 402, or any other location accessible by either or both the database 410 and user device 402.

In accordance with one or more embodiments of the present invention, the sentiment/tonal adjustment module 408 includes a sentiment analysis module and a tonal analysis module.

The sentiment analysis module can be utilized for evaluating the sentiment quality of a communication. The sentiment analysis module may be provided by IBM® WATSON® Alchemy Language application program interface (API) or WATSON® Natural Language Understanding API. The above mentioned APIs are mentioned for exemplary purposes. Any cognitive AI can be utilized within the sentiment analysis module. The sentiment analysis module can process natural language to incorporate both a linguistic and statistical analysis in evaluating the context of a communication. In text analysis, the sentiment is the attitude or opinion expressed toward something. Sentiment can be positive, "sounds good", negative, "this is bad", or neutral. Sentiment can be calculated based on keywords extracted and evaluated at a keyword level. Additionally, the sentiment analysis may be capable of identifying negations, such as the term "not" and the change in sentiment from the keyword "good" when the phrase is "not" "good". The sentiment analysis may consider intensity when the terms "very" or other adjectives are utilized in combination with a keyword. Additionally, the keywords may be weighted. For instance, a positive phrase such as "like" will have a predefined positive weight, whereas the phrase "love" might have a higher predefined positive weight. Additionally, negative weights may be afforded negative phrases such as "dislike" would have a predefined negative weight and the phrase "hate" might have a higher negative weight. The sentiment analysis module can evaluate the content to provide a sentiment level. This sentiment level may also include an intensity value.

The tonal analysis module may be IBM® WATSON® Tone analyzer service, for example. The tonal analysis module can use linguistic analysis to detect three types of tones from the text. The natural language content is analyzed by the tonal analysis module for determining the emotional impact, social tone, and writing style that the content projects. The tonal analysis module may provide tonal scores for emotional tone, social tone, and language tone. For emotional tone, the tonal analysis module may utilize the emotions for "joy", "fear", "sadness", "disgust" and "anger". Each natural language element is evaluated with respect to each emotion. Each emotion may be evaluated from lower values having a value range that indicates if that emotion is less likely to appear as perceived or alternatively to a higher value range if the emotion is more likely to be perceived with respect to each natural language content. Other emotions may be utilized as well as a different value score.

For social tone, the five elements of openness, conscientiousness, extraversion, agreeableness, and emotional range are utilized. Openness is evaluated as the extent a person is open to experience a variety of activities. This trait may be provided a value range indicating that it is more likely to be perceived as no-nonsense, straightforward, blunt and obvious, alternatively, a higher value range may be provided if the content indicates that it will be perceived as intellectual, curious, emotionally-aware, or imaginative. Conscientiousness is evaluated as the tendency to act in an organized or thoughtful way. This trait may be provided a value range if the presentation is perceived as spontaneous, laid-back, reckless, unmethodical or disorganized, or alternatively, a higher value range may be provided if the content is perceived as disciplined, dutiful, or confident. Extraversion is evaluated as the tendency to seek stimulation in the company of others. This trait may be provided a value range if perceived as independent, timid, introverted, restrained, boring, or alternatively, a higher value range may be provided if the content is perceived as engaging, seeking attention, assertive, sociable. Agreeableness is evaluated as the tendency to be compassionate and cooperative towards others. This trait may be provided a value range if the presentation is perceived as selfish, uncaring, uncooperative, confrontational or arrogant, or alternatively, a higher value range may be provided if the content is perceived as caring, sympathetic, cooperative, or trustworthy. The emotional range is evaluated as the tendency to be sensitive to the environment. This trait may be provided a value range if the presentation is perceived as calm, bland, content, relaxed or alternatively a higher value range may be provided if the content is perceived as concerned, frustrated angry, passionate, upset, stressed or impulsive. These tones, descriptions, and weights are merely illustrative and additional tones, descriptions or weights may be utilized.

Language tones may be analyzed to measure the user's writing style. The various styles may include analytic, confidence and tentative. The analytic style may focus on the individual's reasoning and analytical attitude about things. The analytic style may be provided a value range if the text contains little or no evidence of analytical tone or alternatively a higher value range if the presentation is more likely to be perceived as intellectual, rational, systematic, emotionless, or impersonal. The confidence style may focus on the presenter's degree of certainty. The confidence style may be provided a value range if the text contains little or no evidence of confidence in tone or alternatively a higher value range if the style is more likely to be perceived as assured, collected, hopeful or egotistical. The tentative style may focus on the presenter's degree of inhibition. The tentative style may be provided a lower value range if the text contains little or no evidence of tentativeness in tone or a higher value range if the style is more likely to be perceived as questionable, doubtful limited, or debatable.

Figure 5:
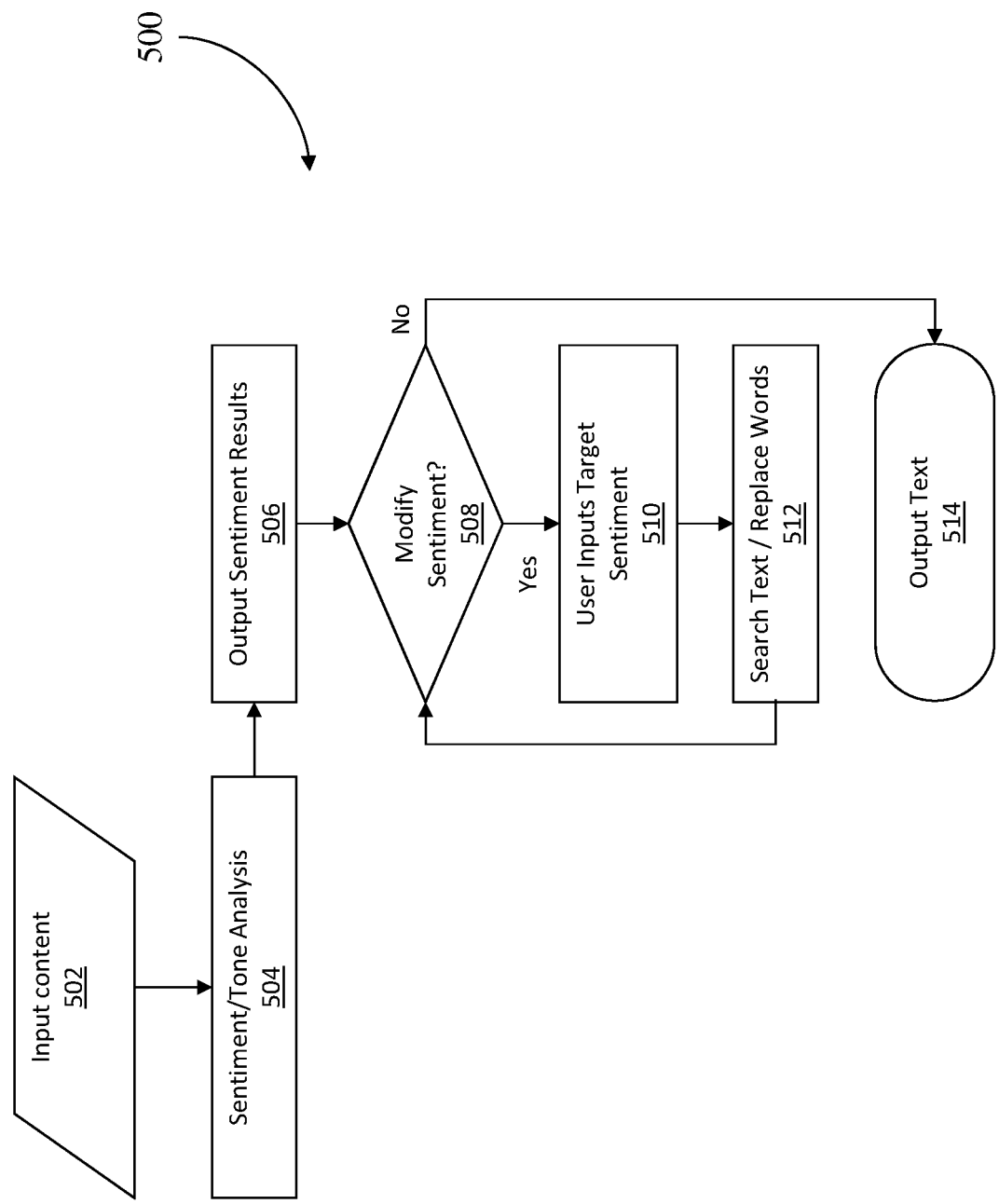
FIG. 5 depicts a flow diagram for content adjustment and display augmentation for communication according to one or more embodiments of the present invention.

FIG. 5 depicts a flow diagram of a method 500 for content adjustment and display augmentation for communication according to one or more embodiments of the present invention. A user can input content into a user device 402, as shown at block 502. The content can be, for example, a text message, an email, a social media posting, and the like. Prior to sending the content, the content is forwarded to the computer server 406 and the sentiment/tonal adjustment module 408 performs a sentiment and tone analysis, as shown at block 504. In some embodiments of the present invention, the sentiment and tonal analysis can be performed on a user device 402 or can be sent, via the network 412 to the server 406 and analyzed by a sentiment/tonal adjustment module 408. The server 406 returns the results of the sentiment and tone analysis which can be displayed on the user interface 404 of the user device 402, as shown at block 506. The user can then decide, at block 508, on whether or not to modify the sentiment based on the results of the analysis. If the user decides not to modify the sentiment, the content (e.g., email) can be sent out, as shown at block 514. Based on the sentiment/tone analysis, the user may wish to further modify the sentiment or tone of the content and proceed to block 510. At block 510, the user can input a target sentiment (desired sentiment level). The input can be any type of input such as, for example, a numerical score, a sliding scale, a word description of a specific tone or sentiment, and the like. The sliding scale example can show a sentiment level indicator between two or more descriptions of tone such as harsh v. soft, sarcastic v. serious, or positive v. negative. The sentiment level can be chosen by the user based on the user's desired sentiment of the message being sent to a specific user or the system 400 can analyze historical data regarding past interactions between the user and the recipient of the message. Once the desired sentiment level is inputted/altered, the text of the content is changed on the user interface 404 for the user, as shown at block 512. The user can either accept all text changes or select one or more of the changes and reject any remaining changes. In addition, at block 512, the user is directed to block 508 to determine if they wish to further modify the sentiment of the message before deciding on whether or not to send the message out at block 514. The adjustments to the message can be iterated multiple times until the user is satisfied with the message. At this point, the "No" branch will be taken at block 508 and the message will be sent at block 514.

Figure 6:
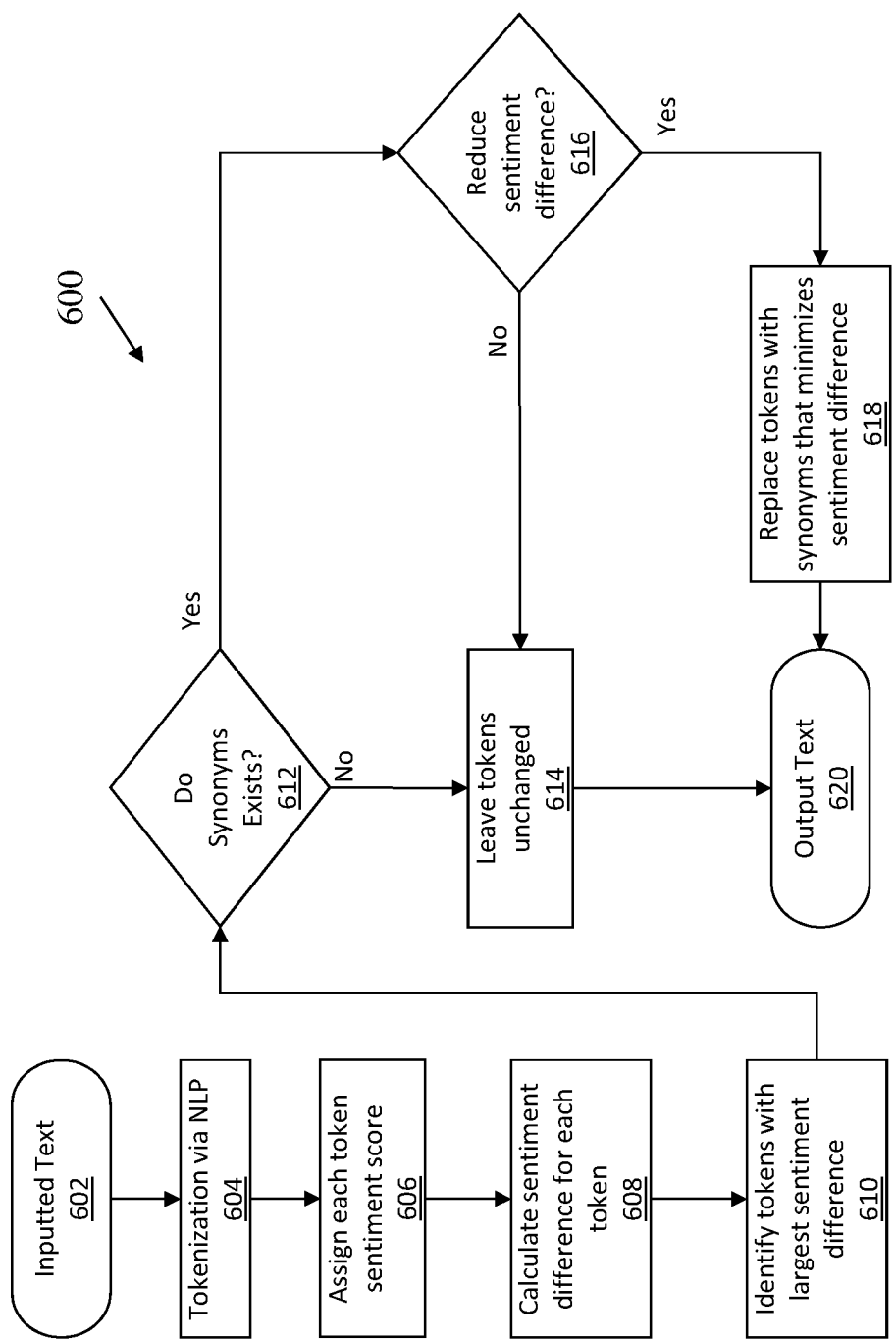
FIG. 6 depicts a flow diagram for text search and word replacement according to one or more embodiments of the present invention.

FIG. 6 depicts a flow diagram for text search and word replacement according to one or more embodiments of the present invention. A user can input content into a user device 402, as shown at block 602. The content can be, for example, a text message, an email, a social media posting, and the like. Utilizing natural language processing (NLP) techniques, the text is tokenized as shown at block 604. Tokenization is the process of breaking a stream of text into words, phrases, symbols, or other meaningful elements called tokens. The list of tokens can become an input for further processing. While performing NLP, after tokenization, Part of Speech (POS) tagging occurs where each token is labeled as a part of speech such as noun, verb, adjective, and the like. This POS tagging assists with identifying possible replacement words. Each token can be assigned a sentiment score, as shown at block 606. For each token, the system 400 can determine a sentiment difference between the sentiment of the token and a user's desired sentiment level for the message, as shown at block 608. At block 610, the system 400 can identify tokens that have the largest absolute sentiment difference. This sentiment difference is a difference between the analyzed sentiment of the original inputted text and the target sentiment level set by the user in block 510. The sentiment differences are based on the scores given to each token. For example, a desired sentiment level for positive would analyze the token, "bad," and return a low score for positivity sentiment. This score can be checked against a preset threshold to identify that the token has a high sentiment difference from the desired sentiment. In one or more embodiments, tokens identified as nouns, pronouns, and conjunctions can be excluded. Types of exclusion could include conjunctions (and, but, or, etc.), as well as acronyms and pronouns. These generally cannot be replaced by synonyms, and their impact on sentiment if changed may be minimal.

In one or more embodiments of the present invention, the identified tokens with large sentiment level differences can be analyzed to determine if synonyms exist for the tokens, as shown at decision block 612. If no synonyms exist for the tokens, the tokens are left unchanged (at block 614) and the text can be outputted, as shown at block 620 (i.e., the message sent). At decision block 612, if synonyms exist for at least one of the identified tokens, the flow chart 600 proceeds to decision block 616 where a determination is made as to whether the existing synonyms reduce the sentiment level difference. If the sentiment level difference is not reduced, the decision block proceeds to block 614 and the identified token is left unchanged. If the sentiment level difference is reduced by the existing synonym, the identified token can be replaced with the synonym, as shown at block 618 and the text can be outputted at block 620. The identified token can be automatically replaced or can be manually replaced by a user by selecting either one synonym to replace the identified token or by selecting from a list of synonyms with provided sentiment scores. Alternatively, a synonym may be selected that is a commonly used word in the database of the specific sender's message history such that the output message sounds more like something the sender would actually write based on the sender's historical data of messages.

Figure 7:
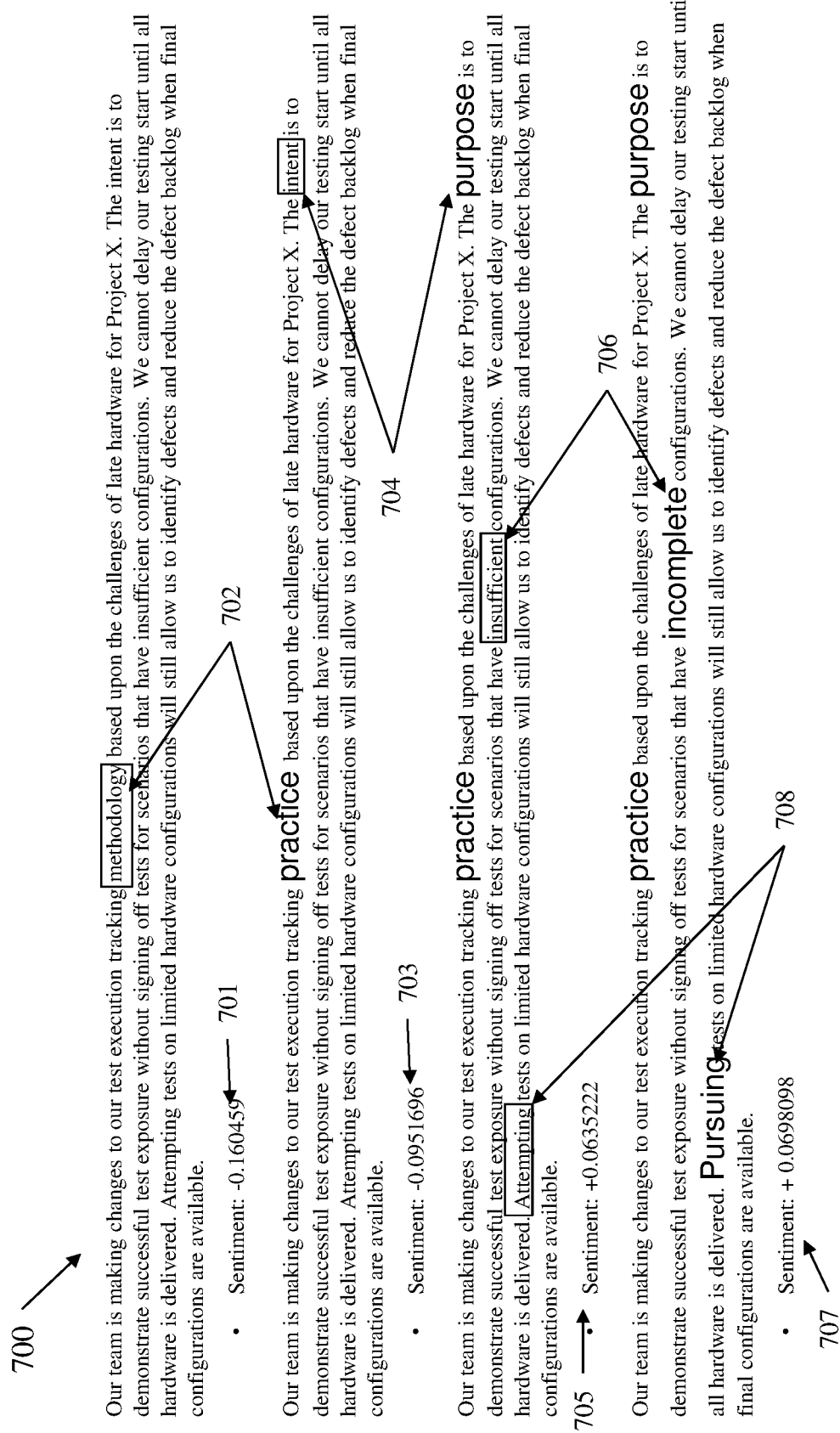
FIG. 7 depicts multiple iterations of text augmentation of communication content according to one or more embodiments of the present invention.

FIG. 7 depicts multiple iterations of text augmentation of communication content according to one or more embodiments of the present invention. The text augmentation 700 can be displayed on the user interface 404 for review by a user prior to sending a message via email, text message, or the like. The text content in FIG. 7 includes the following: "Our team is making changes to our test execution tracking methodology based upon the challenges of late hardware for Project X. The intent is to demonstrate successful test exposure without signing off tests for scenarios that have insufficient configurations. We cannot delay our testing start until all hardware is delivered. Attempting tests on limited hardware configurations will still allow us to identify defects and reduce the defect backlog when final configurations are available." This text content can be analyzed by the sentiment/tonal adjustment module 408 to determine a sentiment level. The text content can have the sentiment level displayed within the user interface 404. The initial text content is shown as having a sentiment level 701 of −0.160459. The user may wish to adjust the sentiment level 701 and the next iteration of the text content shows a change to one of the words from the initial text. The word, "methodology" can be changed to "practice" as shown at 702. The word, "practice," is augmented to draw attention to the user for either selection or confirmation of that particular word. In another embodiment, the user can select the word by clicking on it or touching a touch screen at the display near the word to bring up a menu of options. This menu can include an accept option, a reject option, a request for new word option, and the like for the user to select from. In the present example, the augmented word, "practice" can be accepted, rejected, or replaced by another synonym by the user when analyzing the iteration change in the text content. The sentiment level 703 has changed with the introduction of the synonym "practice" to −0.0951696. More iterations of the text can occur making changes as follows: "intent" changes to "purpose" which causes the sentiment level 705 to change to +0.6035222. In the next iteration, the word "attempting" is changed to "pursuing" and the word "insufficient" is changed to "incomplete." The sentiment level 707 is changed to +0.0698098. This text iteration can continue until a desired sentiment level is achieved for the user who can send the message out. In one or more embodiments of the present invention, the augmentation of the text to show potential changes to the textual content can occur in one iteration with a user selecting which changes to accept or which changes to reject. Or the changes can occur automatically to achieve a desired sentiment level.

In one or more embodiments, a user can adjust the desired sentiment level in real time with augmentation of the text occurring as the user is adjusting the desired sentiment level. For example, a user could utilize a graphical representation of a sliding bar that could alter the desired sentiment level in the text by augmenting the suggested word (or phrase) changes in the text. The augmentation of the text could be of size, font, color, and the like. A determination of the difference in sentiment level between a particular word and the suggested edit could be emphasized or highlighted by changing the size and/or color of the suggested edit. For example, suggested edits in red may have a higher difference in sentiment level than suggested edits in orange. As a user adjusts the desired sentiment level, the suggested edits could change the augmentation to match the difference in sentiment level (e.g., from orange to red based on an increase in sentiment).

In one or more embodiments of the present invention, the text can be inputted into a user device 402 by a user or could be derived from an audio file containing a message and transcribed into text for processing by the system 400.

In one or more embodiments of the present invention, the tone and sentiment adjustment to content can be adjusted based on the recipient of the message. For example, if a user is sending a message to multiple family members, the sentiment analysis module may provide different sentiment adjustments for different family members based on previous message history between the different family members. A message sent to a sibling may have different sentiment than a message sent to the parents. This will result in replacing certain words for siblings versus other words being replaced for the parents. For example, a sarcastic tone may be utilized for siblings, whereas sarcasm or sarcastic words may be replaced for the message sent to the parents. In one or more embodiments, with group text messaging as described above, the single message would be sent out to the group text message but the content adjustment could occur prior to the message being sent resulting in one message from the user being sent out and multiple variations of the message being received by different users based on sentiment analysis.

In one or more embodiments, message history data can be utilized to modify or replace certain words when communicating with a recipient. For example, a text message that is sent to a friend that a user may commonly communicate with can have a more relaxed tone and have different substitutions or replacement words versus a message sent to a work colleague. A work email sent to the work colleague might have a more professional tone associated with the message and would utilize different replacement words.

Figure 8:
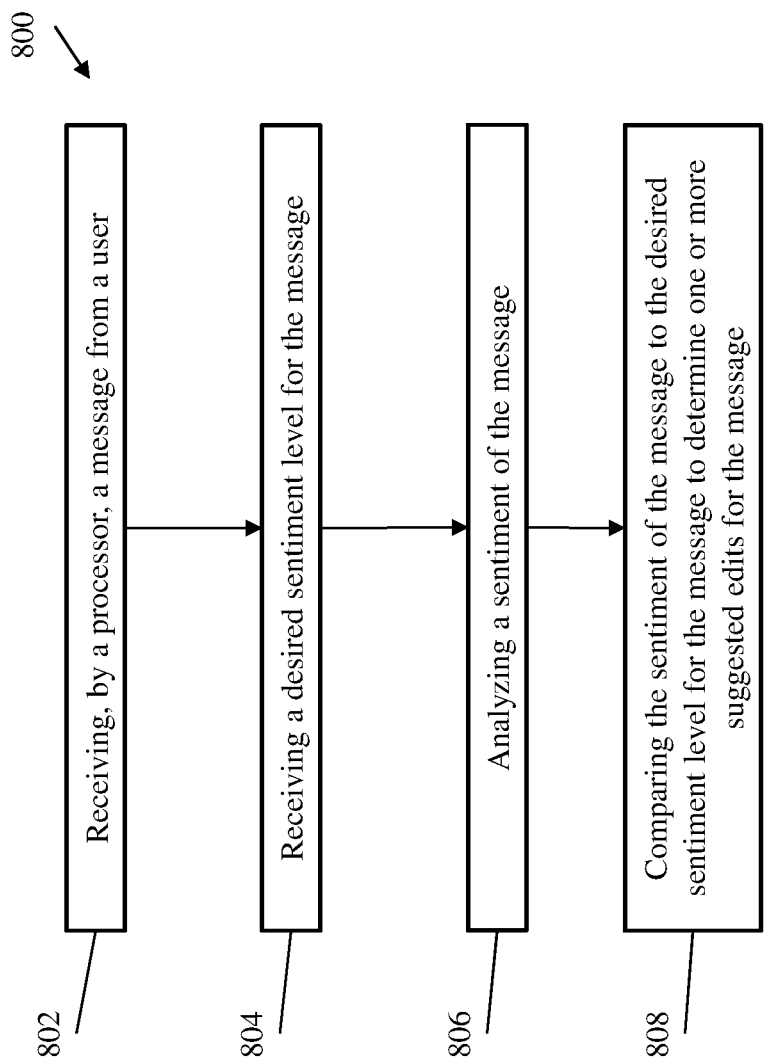
FIG. 8 depicts a flow diagram of a method for content adjustment according to one or more embodiments of the invention.

FIG. 8 depicts a flow diagram of a method for content adjustment according to one or more embodiments of the invention. The method 800 includes receiving, by a processor, a message from a user, as shown at block 802. At block 804, the method 800 include receiving a desired sentiment level for the message. The method 800, at block 806, includes analyzing a sentiment of the message. And at block 808, the method 800 includes comparing the sentiment of the message to the desired sentiment level for the message to determine one or more suggested edits for the message.

Additional processes may also be included. It should be understood that the processes depicted in FIG. 8 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for content adjustment, the method comprising:
    receiving, by a processor, a message from a user;
    receiving a desired sentiment level for the message;
    analyzing a sentiment of the message;
    comparing the sentiment of the message to the desired sentiment level for the message to determine one or more suggested edits for the message;
    providing the one or more suggested edits for the message to the user;
    receiving, by the processor, an indicia from the user, wherein the indicia includes an adjustment to the desired sentiment level for the message; and
    wherein the adjustment to the desired sentiment level for the message is inputted by the user utilizing a sentiment level sliding scale;
    based at least in part on the adjustment to the desired sentiment level for the message, modifying at least one of the one or more suggested edits to the message.

2. The computer-implemented method of claim 1, wherein the one or more suggested edits for the message are displayed in the message.

3. The computer-implemented method of claim 2, wherein the one or more suggested edits are augmented in a display.

4. The computer-implemented method of claim 1, further comprising:
based at least in part on the adjustment to the desired sentiment level for the message, adding a new suggested edit to the message.

5. The computer-implemented method of claim 1, further comprising:
based at least in part on the adjustment to the desired sentiment level for the message, removing at least one of the one or more suggested edits to the message.

6. The computer-implemented method of claim 1, wherein the one or more suggested edits are displayed in a display based at least in part on a user input.

7. The computer-implemented method of claim 1, wherein the desired sentiment level for the message is received from the user.

8. The computer-implemented method of claim 1, wherein the desired sentiment level for the message is derived from a historic sentiment level for the user.

9. The computer-implemented method of claim 1, wherein the one or more suggested edits are selected from a historical database comprising historical words and phrases utilized by the user.

10. The computer-implemented method of claim 1, wherein the one or more suggested edits are based on a mode of communication for the message.

11. The computer-implemented method of claim 1, wherein the one or more suggested edits are based on historical communication between the user and a recipient of the message.

12. The computer-implemented method of claim 1, further comprising:
receiving, by the processor, second indicia from the user, wherein the second indicia includes an acceptance of the one or more suggested edits for the message; and
transmitting the message to a recipient.

13. A system for content adjustment, the system comprising:
a processor communicatively coupled to a memory, the processor configured to:
receive a message from a user;
receive a desired sentiment level for the message;
analyze a sentiment of the message;
compare the sentiment of the message to the desired sentiment level for the message to determine one or more suggested edits for the message;
provide the one or more suggested edits for the message to the user;
receive an indicia from the user, wherein the indicia includes an adjustment to the desired sentiment level for the message;
wherein the adjustment to the desired sentiment level for the message is inputted by the user utilizing a sentiment level sliding scale; and
based at least in part on the adjustment to the desired sentiment level for the message, modify at least one of the one or more suggested edits to the message.

14. A computer program product for content adjustment comprising a computer readable storage medium having program instructions embodied therewith, where the program instructions are executable by a processor to cause the processor to perform a method comprising:
receiving a message from a user;
receiving a desired sentiment level for the message;
analyzing a sentiment of the message;
comparing the sentiment of the message to the desired sentiment level for the message to determine one or more suggested edits for the message;
providing the one or more suggested edits for the message to the user;
receiving, by the processor, an indicia from the user, wherein the indicia includes an adjustment to the desired sentiment level for the message;
wherein the adjustment to the desired sentiment level for the message is inputted by the user utilizing a sentiment level sliding scale; and
based at least in part on the adjustment to the desired sentiment level for the message, modifying at least one of the one or more suggested edits to the message.

* * * * *